United States Patent

Pauls et al.

[11] Patent Number: 6,054,499
[45] Date of Patent: *Apr. 25, 2000

[54] PREPOLYMER COMPOSITION FOR INSULATING FOAMS

[75] Inventors: Mathias Pauls, Appenzell; Rene Schumacher, Goldach, both of Switzerland

[73] Assignee: Rathor AG, Appenzell, Switzerland

[ * ] Notice: This patent is subject to a terminal disclaimer.

[21] Appl. No.: 08/492,118

[22] PCT Filed: Feb. 10, 1994

[86] PCT No.: PCT/EP94/00383

§ 371 Date: Oct. 16, 1995

§ 102(e) Date: Oct. 16, 1995

[87] PCT Pub. No.: WO94/18265

PCT Pub. Date: Aug. 18, 1994

[30] Foreign Application Priority Data

Feb. 10, 1993 [DE] Germany ................ 43 03 849
Feb. 10, 1993 [DE] Germany ................ 43 03 848

[51] Int. Cl.7 ................ B65D 83/14; C08J 9/14; C08J 9/12; C08K 5/01
[52] U.S. Cl. ............. 521/132; 222/129; 252/182.2; 252/182.22; 521/130; 521/131; 521/137; 521/140; 521/159
[58] Field of Search ................ 521/132, 130, 521/131, 159, 137, 140; 222/129; 252/182.2, 182.22

[56] References Cited

U.S. PATENT DOCUMENTS

| | | | |
|---|---|---|---|
| 3,454,504 | 7/1969 | Murai et al. | 521/110 |
| 3,830,760 | 8/1974 | Bengtson | 521/112 |
| 4,263,412 | 4/1981 | Pauls | 521/159 |
| 4,508,244 | 4/1985 | Plaschka et al. | 222/153 |
| 4,651,899 | 3/1987 | Pauls et al. | 222/130 |
| 4,929,646 | 5/1990 | Nichols et al. | 521/137 |
| 5,032,662 | 7/1991 | Berger et al. | 528/25 |
| 5,079,270 | 1/1992 | Burkhart et al. | 521/117 |
| 5,510,054 | 4/1996 | Mussini | 252/182.23 |
| 5,614,566 | 3/1997 | Burkhart et al. | 521/132 |
| 5,690,855 | 11/1997 | Nichols et al. | 252/182.27 |

OTHER PUBLICATIONS

Sax et al; *Hawley's Condensed Chemical Dictionary, Eleventh Edition*; Van Nostrand Reinhold; New York; 1987; p. 932.

*Primary Examiner*—Rabon Sergent
*Attorney, Agent, or Firm*—Peters, Verny, Jones & Biksa, LLP

[57] ABSTRACT

A prepolymer composition for producing polyurethane insulating foams from pressure tanks which consists of a prepolymer component with at least one PU prepolymer with a content of NCO groups of 4 to 20 wt % and usual additives, as well as a propellant component, with a content of 0.01 to 2 wt %, based on the prepolymer component, of polybutadiene.

23 Claims, No Drawings

PREPOLYMER COMPOSITION FOR INSULATING FOAMS

DESCRIPTION

This invention relates to a prepolymer composition for producing polyurethane insulating foams from pressure tanks which consists of a prepolymer component with at least one PU prepolymer with a content of NCO groups of 4 to 20 wt % and usual additives as well as a propellant component. The invention furthermore relates to the use of polybutadiene as an additive to prepolymer compositions for producing one component (1C) and two component (2C) polyurethane insulating foams for controlling cell opening and dimensional stability, as well as to pressure cans with such a prepolymer composition and optionally a separate polyol component for producing 1C and 2C polyurethane insulating foams.

The inventive prepolymer composition is used for producing polyurethane insulating foams which are used particularly for insulating purposes by foaming in cavities. The main areas of application are the construction industry, but also technical products in which cavities must be filled to avoid condensation nests. When one-component polyurethane foams are spoken of, these are applied by discharging the prepolymer composition from pressure tanks, for example aerosol cans, on the spot with the help of propellants with a bulk density of 10 to 50 g/l, and processed. 1C foams are moisture-hardening, i.e. they can be cured solely with the help of the moisture contained in the air and substrate moisture.

Two-component polyurethane foams require a second hydroxy component for curing the prepolymer composition, generally a polyol which must be added directly before foam formation. Curing can be accelerated by catalysts. Bulk densities in 2C foams are characteristically 10 to 100 g/l.

Transitional forms between 1C and 2C foams are possible. In this case a quantity of a hydroxyl component insufficient for reacting the isocyanate groups is added to the prepolymer before discharge. The invention also covers such "1.5C foams", as well as foams which are produced with more than one separately added component.

Conventional prepolymer compositions for 1C and 2C polyurethane insulating foams contain a prepolymer component having a minimum content of reactive NCO groups. The prepolymer itself is a polymer of suitable viscosity with terminal NCO groups. The composition contains a certain quantity of monomeric isocyanate. Suitable isocyanates are for example isophorone diisocyanate, referred to as IPDI, tolylene diisocyanate, also referred to as TDI, diisocyanatotoluene, 1,5diisocyanatonaphthalene, referred to as NDI, triisocyanatotrimethylmethane, 1,6-diisocyanatohexane, referred to as HDI, or 4,4-diisocyanatodiphenylmethane in a raw and pure form or as a mixture. An especially common one is 4,4-diisocyanatodiphenylmethane, also referred to as MDI, which is used both in a raw form (raw MDI) and in the form of pure 2,4- and 4,4-isomers or mixtures thereof. One can likewise use the two common TDI isomers alone or in a mixture. For producing the prepolymer component one reacts such isocyanates with hydroxy polyethers, polyesters or polyvalent alcohols, making sure the prepolymer acquires a viscosity suitable for the composition.

As mentioned above, PU prepolymers suitable for producing polyurethane insulating foams from pressure tanks contain a residual content of unreacted monomeric isocyanate which can be up to 40%. This residual content is usually due to manufacturing, but is also desirable since it has turned out that this residual content has a positive effect on the serviceability, in particular the inherent and dimensional stability, of the produced foams. On the other hand monomeric isocyanates are deemed dangerous substances subject to identification because of their toxicity, despite their generally rather low volatility. MDI, the preferred initial isocyanate for 1C foams, is subject to a maximum working place concentration of 500 ppm. Because of the toxicity of the contained substances packings having residues of these prepolymers are subject to cost-intensive restrictions on disposal.

Although it is possible to produce low-monomer or substantially monomer-free prepolymers with low residual monomer contents, the low serviceability, in particular shrinkage behavior, of the produced foams has prevented the use of such prepolymer compositions up to now. Low-monomer prepolymers can be produced for example by removal of the monomer through distillation and optionally further reaction with a reactive hydroxy polyether and/or polyester and/or vegetable oil, modified or unmodified.

In view of the disadvantages of known PU prepolymers containing monomeric isocyanate it is desirable to provide a PU prepolymer containing less monomeric isocyanate than up to now while guaranteeing the dimensional stability of foam demanded particularly by the construction industry. It is in particular the goal of the invention to provide a prepolymer composition for dimensionally stable 1C and 2C PU foams which contains toxic and/or irritant components in quantities so low that they are no longer subject to identification.

In addition there is a need for additives promoting the dimensional stability of insulating foams to be used for monomer-containing as well as low-monomer and monomer-free prepolymers.

This goal is achieved with a prepolymer composition of the above-mentioned type which has a content of 0.01 to 2 wt %, based on the prepolymer component, of polybutadiene or co-polymers of 1,3-butadiene with up to 50 mol % of other dienes or vinylaromatic compounds, the polybutadiene or copolymer having a molecular weight of 1,000 to 9,000.

The addition of a low quantity of polybutadiene makes it possible to improve the dimensional behavior of low-monomer PU prepolymers and obtain a fully foamable, substantially dimensionally stable and fully serviceable insulating material. Polybutadiene can be used in combination with PU prepolymers from all usual isocyanates, but is especially advantageous in combination with PU prepolymers based on HDI and MDI.

Suitable polybutadienes to be used are particularly liquid products as are offered by Hulls AG with a viscosity of at least 500 mPa.s at 20° C. Viscosity is preferably at least 2000 mPa.s at 20° C. and in particular about 3000 mPa.s at 20° C. An especially suitable liquid polybutadiene is sold under the designation Polyol 130 with about 75% 1,4-cis double bonds, about 24% 1,4-trans double bonds and about 1% vinyl double bonds and a molecular weight (vapor-pressure osmotic) of about 3000. The content of liquid polybutadiene according to the invention is 0.01 to 2 wt % and preferably 0.05 to 1 wt %, based on the prepolymer component to which it is added.

Suitable polybutadienes are furthermore those products of higher molecular weight which can be added to the prepolymer composition in a dissolved form or be dissolved therein. Also one can use higher-molecular polymeric hydrocarbons containing double bonds.

The molecular weight of suitable stabilizing additives is 1000 to 9000, in particular up to 5000.

Along with pure (liquid) polybutadiene one can also use copolymers of 1,3-butadiene with other 1,3-dienes, for example isoprene, 2,3-dimethylbutadiene and piperylene, and with vinylaromatic compounds such as styrene, α-methylstyrene, vinyl toluene and divinylbenzene. The content of comonomers in the copolymers should not exceed 50 mol %. Such copolymers are regarded as falling within the designation "(liquid) polybutadiene" if they are liquid or soluble.

It is assumed that the dimensionally stabilizing effect of polybutadiene is based on its ability to crosslink in the presence of oxygen.

For producing the inventively applied prepolymer composition one uses conventional aliphatic and aromatic polyisocyanates. In particular one uses polyfunctional isocyanates with a mean of 2 to 4 isocyanate groups, both in monomeric and in oligomeric form. As stated at the outset, these prepolymer compositions are themselves reaction products from monomers or oligomers containing isocyanate groups, and components reactive therewith, in particular hydroxyfunctional compounds. As initial polyisocyanates one can use the abovementioned ones as well as those stated for example in DE-A-42 15 647.

Especially suitable isocyanate prepolymers for these prepolymer compositions are ones based on HDI, trimerized TDI, NDI, 4,4'-dicyclohexylmethanediisocyanate and IPDI, which can be converted especially easily to low-monomer or substantially monomer-free prepolymers. It is pointed out once again, however, that the particular effect of promoted dimensional stability occurs not only in combination with low-monomer or substantially monomer-free prepolymers but also with usual prepolymer compositions with high monomer contents.

The NCO content in the applied prepolymer component is between 4 and 20 wt %, preferably between 6 and 18 wt % and in particular between 7 and 13 wt %.

When producing the isocyanate prepolymers one uses usual hydroxy components, for example polyether, polyester or modified vegetable oils with a sufficient hydroxyl number, approximately in the range of 100 to 300. Castor oil with a hydroxyl number of about 160 is suitable, as are usual glycols, in particular polyethylene glycols.

The monomer-reduced prepolymer itself is obtainable for example by removing the monomer in a thin-layer evaporator. Alternatively or additionally one can react (residual) isocyanate monomer with a hydroxy polyether and/or polyester and/or modified vegetable oil. Suitable vegetable oils are ones with a hydroxyl number of 100 to 300, for example castor oil with a hydroxyl number of about 160. According to the invention it is readily possible to obtain stable foams with such monomer-reduced prepolymer components, provided the polybutadiene is added. A prepolymer composition is termed low-monomer if it has less than 10% monomer, in particular less than 5% monomer; and substantially monomer-free if it has less than 2, preferably less, than 1 and in particular less than 0.5 wt % monomer, always based on the prepolymer component, i.e. the reactive isocyanate-containing component present in the composition.

Suitable initial prepolymers for inventive 1C and 2C foams based on MDI are available for example from Bayer under the designations Desmodur E21, E23, VP LS 2905 and VP LS 2924, which are already relatively low-monomer. These materials have up to now found no acceptance in prepolymer compositions for insulating foams from pressure cans according to TRG 300.

Initial prepolymers also suitable for inventive 1C and 2C foams have proved to be ones based on HDI, as offered for example by Bayer under the designations Desmodur DA and N 3400. These have a residual content of monomeric HDI of less than 0.5 wt %. Desmodur N 3400 is a dimeric HDI. These materials have not been applied in pressure-can foam production up to now either.

The prepolymer can contain usual additives, for example polysiloxanes for cell regulation, flameproofing agents, softeners, catalysts, viscosity regulators, dyes, rheology-controlling additives and the like. The prepolymer composition, i.e. the PU prepolymer including all additives without propellants, expediently has an initial service viscosity at 20° C. of 5000 to 20000 mPa.s and preferably of 8000 to 15000 mPa.s. According to the invention the content of NCO groups in the PU prepolymer is 4 to 20 wt %, preferably 6 to 18 wt % and in particular 7 to 13 wt %, based on the prepolymer.

The inventive prepolymer composition contains in particular propane, butane and/or dimethylether as a propellant component. Further propellants that can be used in the component are fluorocarbons which are liquefiable under the pressure conditions prevailing in a pressure tank, for example R 125, R 134a, R 143 and R 152a. To minimize the content of combustible and halogen-containing propellants one can add further gases which are not condensable under the pressure conditions prevailing in the pressure can, for example $CO_2$, $N_2O$, or $N_2$, —$CO_2$ is particularly preferred since it can partly dissolve in the prepolymer component and thereby contribute to foam formation, while also acting as a good propellant.

The propellant component of the prepolymer composition expediently constitutes 5 to 40 wt %. The $CO_2$ content in the propellant can be for example about 5 wt %, based on the total propellant component. The content of gases not condensable under the prevailing pressure conditions should be such that the volume based on the empty space in the pressure tank yields a pressure of about 8 to 10 bars, depending on the relevant national specification for pressure tanks (aerosol cans). The empty space in the pressure tank is the space assumed by the uncondensed components of the prepolymer composition.

The liquid butadiene is expediently added to the prepolymer composition in solution along with an emulsifier -for example in a weight ratio of 80/20-, preferably in solution with a hydroxy vegetable oil suitable for controlling the isocyanate content of the PU prepolymer. It has proven especially suitable to use castor oil with a hydroxyl number of 160, but any other hydroxy vegetable oils and hydroxy polyethers and polyesters can also be used. These are hydroxy components as are conventionally used for modifying viscosity in the formulation of prepolymer compositions.

The inventive prepolymer compositions can be used as 1C and as 2C polyurethane foams. With 2C foams the polyol component required for curing the foam is kept separate from the prepolymer composition in known fashion and added only directly before or during discharge. The corresponding methods are widely described and known to the expert, as are suitable two-component pressure cans with a separate tank for the second component.

The second component can be in particular usual polyols, in particular glycol, glycerine and butanediol. To accelerate the curing reaction it may be expedient to add to this second component a usual catalyst, for example tin dioctoate, cobalt naphthenate and octoate, dibutyl tin dilaurate, metallic, in particular ferrous, acetonylacetate, DABCO crystalline and N-methyl-2-azanorbornane. Further catalysts are triethylenediamine, trimethylaminoethylpiperazine, pentamethyldiethylenetriamine, tetramethyliminobispropylamine, bis(dimethylaminopropyl)-N-isopropanolamine. It is also suitable to use heteroaromatic amines, as stated for example in DE-A-42 15 647.

The invention finally relates to the use of liquid polybutadiene, as defined above, as an additive to isocyanate prepolymer compositions for 1C and 2C polyurethane insulating foams for controlling cell opening and dimensional stability. The invention also relates to pressure cans for discharging 1C and 2C polyurethane insulating foams with a prepolymer composition and optionally a separate polyol component, as described above.

Apart from the abovementioned dimensional stability of the inventive prepolymer composition produced with the addition of liquid polybutadiene, the composition has the further advantage that it can be produced substantially free from chlorine and bromine and set to be fire-retardant without a need to add the usual halogen-containing flame-proofing agents. This means that the addition of flameproofing agents for B2 foams according to DIN 4102 can be largely or fully dispensed with. This is the case in particular if the composition contains phosphorus-containing thinners or softeners (viscosity regulators), for example triethyl phosphate. A synergistic effect with these softeners occurs with nitrogenous additives and vegetable oils, e.g. castor oil. If necessary, the prepolymer compositions can also be set to be substantially halogen-free, i.e. one can dispense not only with halogen-containing flameproofing agents but also with fluorocarbons as propellants. In this case it is sufficient for the propellant component to contain propane, butane, dimethyl-ether and/or $CO_2$.

It has turned out that these flame-retardant properties are due in particular to the trialkyl and triaryl phosphates and phosphonates. One can mention diphenylcresyl phosphate, triphenyl phosphate, triethyl phosphate, dimethylmethane phosphonate and the like. One can further mention 2-ethylhexyldiphenylphosphate and phosphoric acid-1,3-phenylenetetraphenylester, which are commercially available under the designations Posflex 362 and Fyroflex RDP. Such phosphates and phosphonates can be present in the prepolymer composition in a quantity of 5 to 40 wt %, based on the prepolymer component. They have the advantage that they do not disturb the balance of prepolymer, propellant and thinners in the prepolymer composition but rather stabilize it, while conventional halogen-containing flameproofing agents interfere with this balance and can only be present with about 12 to 14 wt %.

The inventive prepolymer composition is produced in the fashion known in the art, whereby if low-monomer prepolymer is used it is put in the pressure tank as such or arises therein. One then adds to the prepolymer the liquid polybutadiene, e.g. mixed with a surface-active agent and emulsified in a hydroxy oil, for example castor oil. The hydroxy oil or castor oil simultaneously serves to finely adjust the NCO content of the prepolymer and lower the monomer content. Then the additives, such as flameproofing agents, stabilizers, softeners, catalysts, etc., are added, whereupon the pressure tank (aerosol can) is sealed and the propellant impressed.

The invention will be explained by the following compositions

EXAMPLE 1

Desmodur E21 as a prepolymer is mixed in a protective atmosphere with a 1% emulsion of a liquid polybutadiene with a molecular weight of about 3000 and a viscosity at 20° C. of 3000 mPa.s and a surface-active agent as an emulsifier (weight ratio 80/20; available from Goldschmidt under the designation TEGO IMR 830) in castor oil with a hydroxyl number of 160, the temperature being carefully controlled. Then usual polysiloxanes are added for stabilization and colloidal silica gel for controlling the rheology along with an amine catalyst (Texacat DMDEE, 2,2-dimorpholinodiethylether).

With constant stirring the desired quantity of the above-described mixture is put in a moisture-free pressure tank which is sealed with a dome provided with a valve, optionally with introduction of a cartridge having the second component. After sealing, a corresponding quantity of propellant is impressed. The individual components of the propellant mixture are expediently impressed successively and optionally filled up again in a second pass. An especially suitable mixture is of 40% propane, 40% butane and 20% dimethylether in combination with a fluorocarbon (R 152a and R 134a) and $CO_2$.

In the following a monomer-reduced prepolymer composition and filling proportions for a pressure tank with a filling ratio of 75% are stated. The composition yields an insulating foam with good dimensional stability and good insulating properties. The content of residual monomer of the composition is under 10 wt %.

| Component | Example 1 |
|---|---|
| Desmodur E21 (16% NCO) | 890 |
| Polysiloxane | |
| Tegostab B 8863T | 15 |
| Polysiloxane | |
| Tegostab BF 2270 | 15 |
| (hydroxyl number 40) | |
| Tego IMR 830 (1%)* | 50 |
| Silica gel Aerosil 200 | 15 |
| Amine catalyst | |
| Texacat DMDEE | 15 |
| Prepolymer comp. (parts by weight) | 1000 |
| NCO (wt %) | 13.7 |
| Prepolymer density (g/CM3) | 1.11 |
| Prepolymer composition | |
| Modified prepolymer | 312 g |
| Propane/butane/dimethylether | |
| gas mixture (d = 0.56) | 30 g |
| Fluorocarbon | |
| R 152a | 45 g |
| $CO_2$ | 4 g |
| Total | 391 g |
| Gas fraction (wt %) | 20% |

*1% emulsion in castor oil, hydroxyl number 160; Tego IMR 830 contains 80% of the above mentioned liquid butadiene and 20% of a surface-active agent emulsifier.

EXAMPLES 2 AND 3

Inventive prepolymer composition using conventional initial isocyanates were produced by the following recipes analogously to Example 1. The compositions yield an insulating foam with good dimensional stability and good insulating properties. The content of residual monomer in the compositions is 7 wt %.

In the list Desmophen PU 1578 designates a polyol with hydroxyl number 213 and Desmodur 44 V 20 L a polyisocyanate with 31.6 wt % NCO groups. Disflamoll DPK designates a softener based on diphenylcresyl phosphate. The flameproofing agent Fyroflex RDP designates phosphoric acid-1,3-phenylenetetraphenylester.

| Component | Example 2 | Example 3 |
|---|---|---|
| Desmophen PU 1578 | 380 | 380 |
| Disflamoll DP | 543 | 273 |
| Fyroflex RDP | — | 270 |
| egostab BF 2270 | 20 | 20 |
| Tego IMR 830 (10%)* | 50 | 50 |
| Texacat DMDEE | 7 | 7 |
| Polyol mixture (parts by weight) | 1000 | 1000 |
| Polyol mixture | 275 g | 275 g |
| Desmodur 44 V 20 L | 385 g | 385 g |
| R 134a | 75 g | 75 g |
| i-butane | 30 g | 30 g |
| Dimethylether | 35 g | 35 g |
| Total | 800 g | 800 g |
| Gas fraction (wt %) | 18% | 18% |
| NCO (wt %) | 15.6 | 15.6 |

*10% emulsion in castor oil, hydroxyl number 160

EXAMPLES 4 TO 6

Inventive prepolymer compositions using conventional initial isocyanates were produced by the following recipes analogously to Examples 1 to 3. The compositions yield an insulating foam with good dimensional stability and good insulating properties. The content of residual monomer in the compositions is under 10 wt %.

In the list Desmodur VPLS 2924 designates a prepolymer with an isocyanate content of 24.0%, Firemaster 836 a commercial flameproofing agent and the gas mixture a propellant mixture of 30% propane, 30% isobutane and 40% dimethylether.

| Component | Example 4 | Example 5 | Example 6 |
|---|---|---|---|
| Desmodur VPLS 2924 | 308 | 308 | 308 |
| Firemaster 836 | 100 | 100 | 100 |
| Disflammol DPK | 500 | 500 | 500 |
| Tegostab BF 2270 | 20 | 20 | 20 |
| Tego IMR 830* | 50 | 50 | 50 |
| Aerosil 200 | 15 | 15 | 15 |
| Prepolymer composition (parts by weight) | 1000 | 1000 | 1000 |
| NCO (wt %) | 13.7 | 13.7 | 13.7 |
| Density (g/ml) | 1.11 | 1.11 | 1.11 |
| Mod. prepolymer comp. | 700 g | 670 g | 725 g |
| Gas mixture | | 70 g | |
| R 152a | 160 g | | |
| R 134a | | 80 g | 140 g |
| Dimethylether | | | 20 g |
| $CO_2$ | 4 g | 4 g | 4 g |
| *Total | 864 g | 824 g | 889 g |
| Gas fraction (wt %) | 19% | 19% | 18% |

*10% emulsion in castor oil, hydroxyl number 160.

EXAMPLE 7

A composition for 1.5C foams was prepared as follows.

| Component | Parts by weight |
|---|---|
| Castor oil | 320 |
| Softener | 420 |
| Levagard PP.(TMCP) | |
| Ixol M 125 | 170 |
| Tego IMR 830 (10%) | 50 |
| Tegostab B 1048 | 30 |
| Catalyst | 10 |
| Polyol component | 1000 |
| Polyol component | 142 g |
| Desmodur N 3400 | 181 g |
| Propellant R 134a | 30 g |
| R 152a | 60 g |
| DME | 10 g |
| Crosslinker: | |
| Ethylene glycol | 12 g |
| Thancat AT 10 | 5 g |
| Total | 427 g |
| NCO (wt %) | 3.86 |

Desmodur N 3400 is an aliphatic HDI polyisocyanate with 20% NCO. Ixol M 125 is a polyester polyol with a hydroxyl number of 239. TMCP designates trismonochloroisopropylphosphate.

What is claimed is:

1. A filled pressurized can comprising:

(A) a can, and (B) a prepolymer composition for producing dimensionally stable polyurethane insulating foams, which prepolymer composition itself comprises:

(i) a prepolymer component which has at least one polyurethane prepolymer which has a content of NCO groups of 4 to 20 wt % and optional additives, and (ii) polybutadiene selected from the group consisting of a liquid polybutadiene and liquid copolymers of 1,3-polybutadiene which have up to 50 mol % of other organic dienes or vinyl aromatic compounds, and (C) a propellant component, wherein said prepolymer composition comprises between 0.01 to 2 wt % of polybutadiene, based on the weight of the prepolymer component, wherein said liquid polybutadiene or its liquid copolymers have a molecular weight of between 1,000 to 9,000 and have the ability to cross-link with each other in the presence of oxygen.

2. The filled pressurized can of claim 1, wherein the polyurethane prepolymer comprises aliphatic and aromatic polyisocyanates and hydroxy reaction components.

3. The filled pressurized can of claim 2 wherein the content of liquid polybutadiene is between about 0.02 and 1 wt % of the total prepolymer component.

4. The filled pressurized can of claim 2, wherein the polyisocyanate is selected from the group consisting of hexamethylene-1,6-diisocyanate, naphthalene-1,5-diisocyanate, tolylenediisocyanate, isophorone diisocyanate, diphenylmethane diisocyanate, and dicyclohexylmethane diisocyanate.

5. The filled pressurized can of claim 4 wherein the content of liquid polybutadiene is between about 0.02 and 1 wt % of the total prepolymer component.

6. The filled pressurized can of claim 1 wherein the content of liquid polybutadiene is 0.02 to 1 wt % of the total prepolymer component.

7. The filled pressurized can of claim 6, wherein the liquid polybutadiene contains about 75% 1,4-cis double bonds, about 24% 1,4-trans double bonds and about 1% vinyl double bonds, and the liquid polybutadiene has a molecular weight, determined by vapor-pressure osmosis, of about 3000 and a viscosity at 20° C. of about 3000 mPa.s.

8. The filled pressurized can of claim 7 wherein the propellant content is between about 5 and 40 wt % of the total prepolymer composition.

9. The filled pressurized can of claim 1 wherein the propellant content is about 5 to 40 wt % of the prepolymer composition.

10. The filled pressurized can of claim 9, wherein the propellant component is selected from the group consisting of propane, butane, dimethyl ether and mixtures thereof.

11. The filled pressurized can of claim 1, wherein the propellant component is selected from the group consisting of propane, butane, dimethylether and mixtures thereof.

12. The filled pressurized can of claim 1, wherein the propellant component contains fluorocarbon selected from the group consisting of $C_2HF_5$, $C_2H_2F_4$ $C_2H_3F_3$, $C_2H_4F_2$ and mixtures thereof.

13. The filled pressurized can of claim 12 wherein the propellant component contains $CO_2$.

14. The filled pressurized can of claim 1, wherein the propellant component contains $CO_2$.

15. The filled pressurized can of claim 14, wherein the $CO_2$ content is about 5 wt %, based on the propellant component.

16. The filled pressurized can of claim 15 wherein the initial service viscosity of the PU prepolymer is between about 8000 and 15000 mPa.s.

17. The filled pressurized can of claim 1, wherein the initial service viscosity of the polyurethane prepolymer at 20° C. is 5000 to 20000 mPa.s.

18. The filled pressurized can of claim 17, wherein the initial service viscosity of the polyurethane prepolymer is 8000 to 15000 mPa.s.

19. The filled pressurized can of claim 18 wherein the prepolymer component is for a one component system to discharge to produce one component polyurethane insulating foam from the can.

20. The filled pressurized can of claim 1 wherein the prepolymer component is for a one component system to discharge one component polyurethane insulating foams from the can.

21. The filled pressurized can of claim 1 which upon discharge produces transitional forms of polyurethane insulating foams which produced polyurethane insulating foams are derived from between one component and two component prepolymer components which have the prepolymer composition of claim 1, and at least one separate further component.

22. A filled pressurized can to discharge polyurethane insulating foams, which produced insulating polyurethane foams include transitional forms between one component and two component polyurethane insulating foams and which include a prepolymer composition, wherein the filled pressurized can comprises:

(a) a can, (b) a prepolymer composition which itself comprises:

(i) a prepolymer component which has at least one polyurethane prepolymer which has a content of NCO groups of 4 to 20 wt % and optionally additives, and (ii) polybutadiene selected from the group consisting of a liquid polybutadiene and liquid copolymers of 1,3-polybutadiene which have up to 50 mol % of other organic dienes or vinyl aromatic compounds, and (c) a propellant component, wherein said prepolymer composition comprises between 0.01 to 2 wt % of polybutadiene based on the total weight of the prepolymer component, wherein said liquid polybutadiene or its liquid copolymers have a molecular weight of between 1,000 to 9,000 and have the ability to cross-link with each other in the presence of oxygen, and (d) at least one additional component.

23. The filled pressurized can of claim 22 wherein the propellant component contains fluorocarbon selected from the group consisting of $C_2HF_5$, $C_2H_2F_4$ $C_2H_3F_3$, $C_2H_4F_2$ and mixtures thereof.

* * * * *